March 3, 1970 P. S. SIZER ET AL 3,498,376
WELL APPARATUS AND SETTING TOOL
Filed Dec. 29, 1966 5 Sheets-Sheet 3

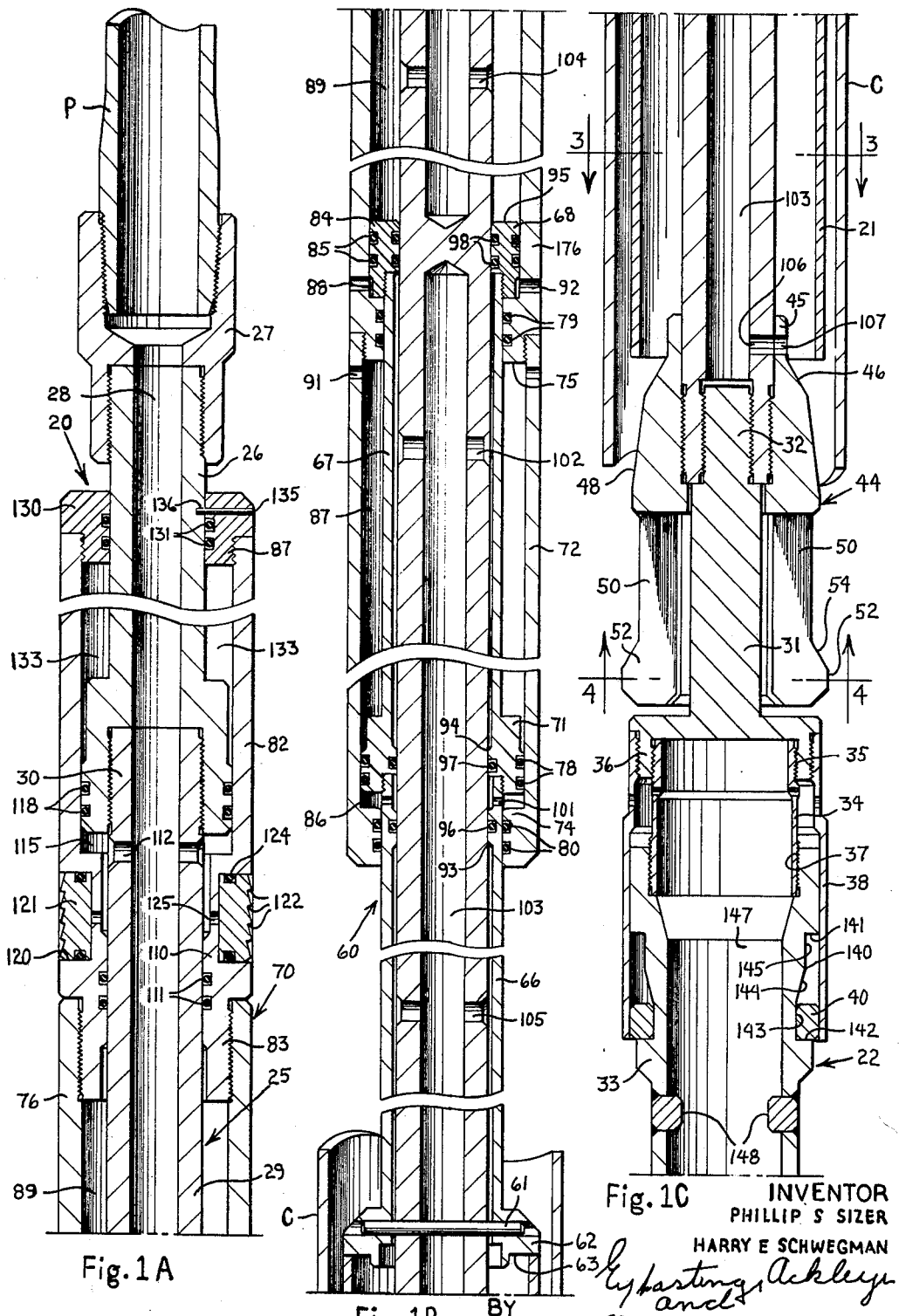

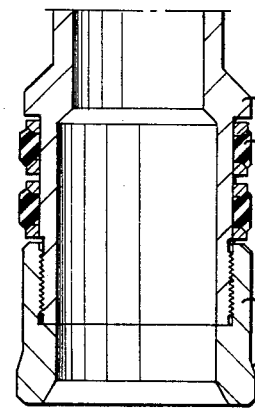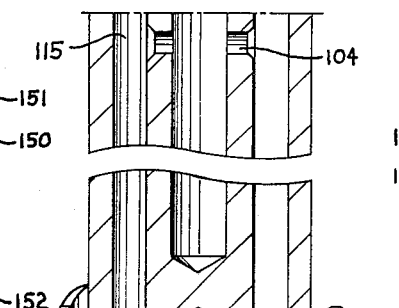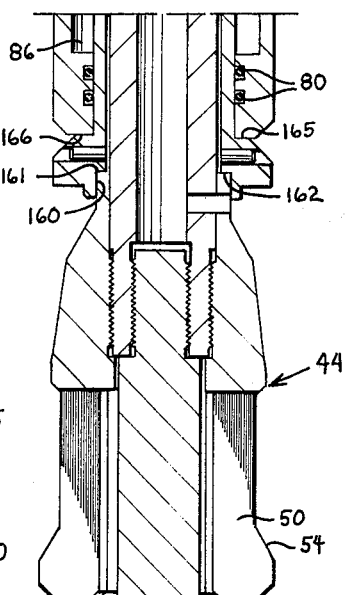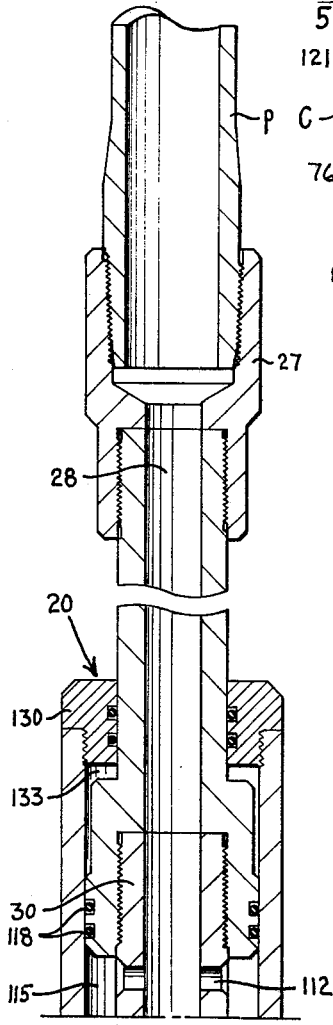

INVENTOR
PHILLIP S. SIZER
HARRY E. SCHWEGMAN
BY
ATTORNEYS

March 3, 1970

P. S. SIZER ET AL 3,498,376

WELL APPARATUS AND SETTING TOOL

Filed Dec. 29, 1966

INVENTORS
PHILLIP S. SIZER
HARRY E. SCHWEGMAN

BY *Hastings, Ashley and Walter J. Jaynes*

ATTORNEYS

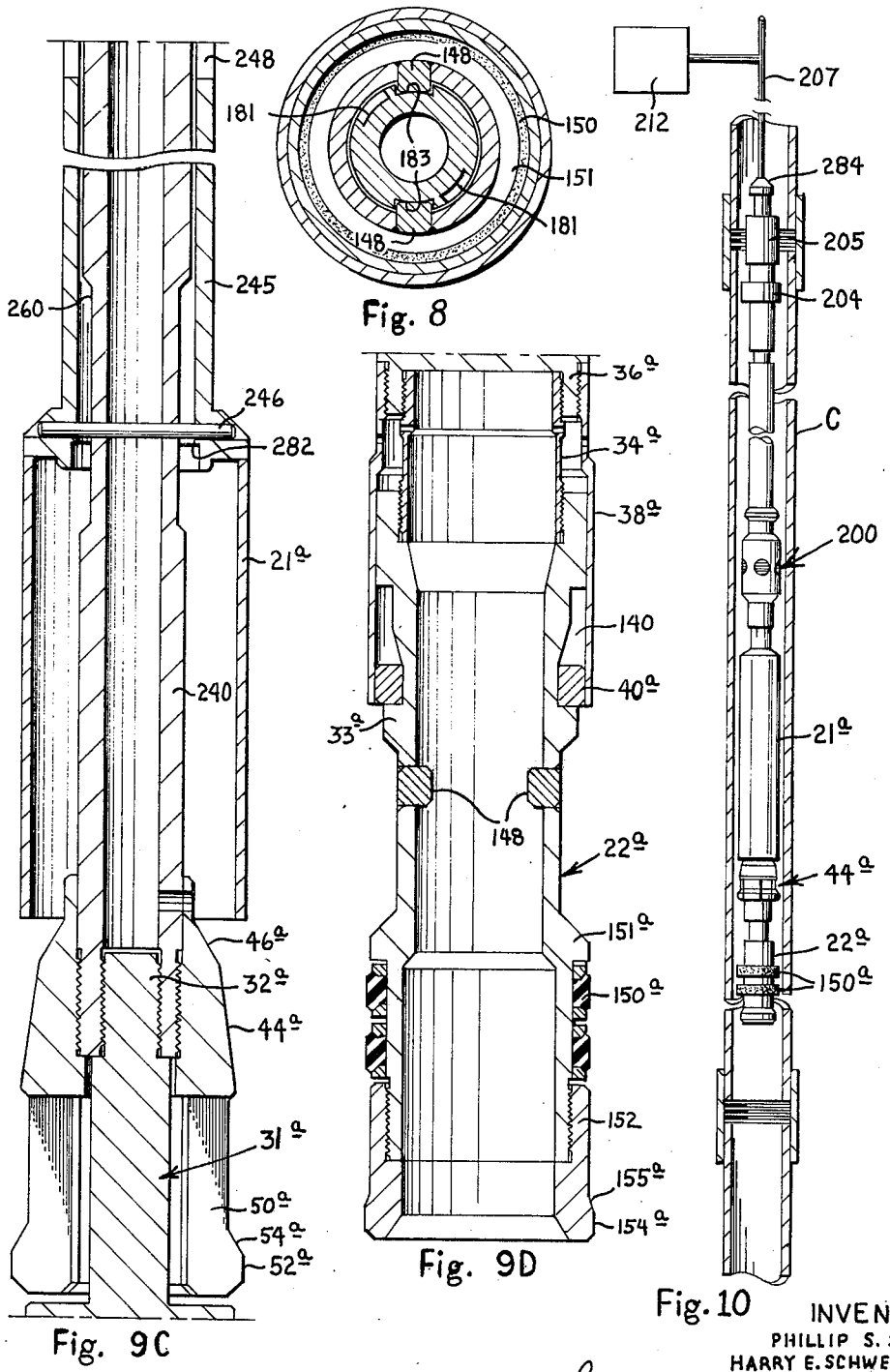

United States Patent Office 3,498,376
Patented Mar. 3, 1970

3,498,376
WELL APPARATUS AND SETTING TOOL
Phillip S. Sizer, 14127 Tanglewood Drive, Dallas, Tex. 75234, and Harry E. Schwegman, 2500 Bighorn Lane, Richardson, Tex. 75080
Filed Dec. 29, 1966, Ser. No. 605,870
Int. Cl. E21b 3/04, 43/10, 43/00
U.S. Cl. 166—120
17 Claims

ABSTRACT OF THE DISCLOSURE

A method of completing a well by installing in the well a flow conductor, performing various operations such as cementing the flow conductor in the well bore, drilling out excess cement from the flow conductor, perforating the casing at desired locations, and the like, installing a liner in the flow conductor of smaller internal diameter than the internal diameter of the flow conductor to provide an internal seal surface and oppositely facing stop shoulders in the flow conductor, setting a packer in the liner, and then installing an inner production flow conductor in the well and securing it to the packer. A setting tool for simultaneously locating a liner and a packer in a flow conductor, expanding the liner into sealing and anchored engagement in the flow conductor and then setting the packer in the liner.

---

This invention relates to a method of completing a well and to well tools usable in completing wells.

An object of the invention is to provide a new and improved method of completing a well by installing a flow conductor, such as a well casing, in the bore of a well, wherein the casing has no internal restrictions to interfere with the movement of fluids in its longitudinal passage and providing a restriction in the casing to provide the well casing at a desired location with an internal seal surface of smaller diameter than the passage of the well casing and oppositely facing stop shoulders, the stop shoulders being engageable by means of a well tool which is installable in the well casing at such restriction.

Another object is to provide a method of completing a well which includes the additional step of installing a well tool in the well casing which has seal means which engages the seal surfaces and latch means engageable with the stop shoulders provided by the restriction to secure the well tool in the flow conductor.

Another object is to provide a method of completing a well wherein the restriction at the predetermined location is provided by moving a longitudinally corrugated liner into the flow conductor and then expanding the liner into anchored and sealing engagement with the well casing, the opposite end surfaces of the liner providing the oppositely facing stop shoulders and its internal surface providing the seal surface.

Still another object is to provide a method of completing a well which includes the step of simultaneously with the movement of the liner into the casing also moving a packer and then setting the packer in the liner after it has been expanded in the well casing.

Another object is to provide a method of completing the well which includes the step of mounting the liner on a setting tool to whose lower end is secured a packer, the setting tool having an expander means between the packer and the liner whereby upward movement of the setting tool while the liner is held against upward movement in the flow conductor will expand the liner into anchored and sealing engagement with the casing and then set the packer in the expanded liner.

Still another object is to provide a new and improved method of locating and securing a liner in a predetermined location in a well casing having sections secured by collars which provide internal annular recesses at known locations in the well casing, which includes moving a well tool assembly including a collar recess locator and the setting tool carrying an unexpanded liner and a packer through the well casing and locating the liner at a predetermined location by means of the recess locator, expanding the liner into anchored and sealing engagement in the well casing by operation of the setting tool, and setting the packer in the expander liner.

A main object of the invention is to provide a new and improved setting tool for positioning a longitudinally corrugated liner in a flow conductor, such as a well casing, which has means for expanding the liner into sealing and anchored engagement with the well casing at a desired location therein.

Another object is to provide a setting tool which has means operative by fluid pressure for holding the liner against upward movement in the flow conductor and an expander movable upwardly relative to the liner, when it is held against upward movement, for expanding the liner into sealing and anchored engagement with the well casing.

Still another object is to provide a setting tool wherein the means for holding the liner includes anchor means movable into engagement with the well casing by fluid pressure applied thereto and a hold down means releasably secured against upward movement relative to the anchor means for holding the liner against upward movement in the well casing while the expander is moving upwardly thereinto.

A further object is to provide a setting tool of the type described wherein the operative fluid pressure may be provided to the setting tool through a flow conductor by means of which the setting tool is movable into the well casing.

A still further object is to provide a setting tool wherein the operative fluid pressure is provided by a gas generating means of the setting tool whose actuation is controllable from the surface of the well.

Another object is to provide a setting tool wherein the setting tool has means for holding the hold down means against upward movement relative to the anchor means until the expander of the setting tool has been moved upwardly a predetermined distance relative to the hold down means.

Another object is to provide a new and improved packer, which is releasably connectable to the lower end of a liner expanding tool which has a bottom stop shoulder engageable with a bottom end surface of an expanded liner and a latch releasably held in retracted position by the setting tool which expands when the setting tool is released from the packer to engage the top end surface of the expanded liner to limit its downward movement relative to the liner.

Still another object is to provide a packer having seal means engageable with the internal surface of the liner and with latch means engageable with another well tool, such as a latch mandrel connectable to the lower end of a string of tubing.

Additional objects and advantages of the invention will be readily apparent from the reading of the following description of a device constructed in accordance with the invention, and reference to the accompanying drawings thereof, wherein:

FIGURES 1A, 1B, 1C, and 1D are vertical sectional views of a setting tool embodying the invention carrying an expanded liner and a packer connected thereto during the movement of the setting tool through a well casing, FIGURES 1B, 1C, and 1D being continuations of FIGURES 1A, 1B, and 1C, respectively;

FIGURES 2A, 2B, 2C, and 2D are vertical sectional views of the setting tool showing the liner in expanded and anchored position in the well casing and the packer set in the liner, the elements of the setting tool being shown in the positions assumed thereby during the removal of the setting tool from the well, FIGURES 2B, 2C, and 2D being continuations of FIGURES 2A, 2B, and 2C, respectively;

FIGURE 8 is a sectional view taken on line 8—8 of FIGURE 7.

Figure 9A:
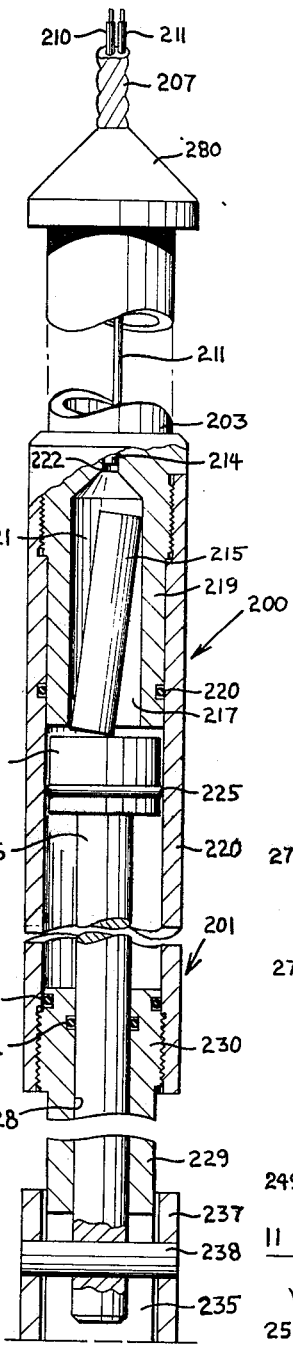
Figure 9B:
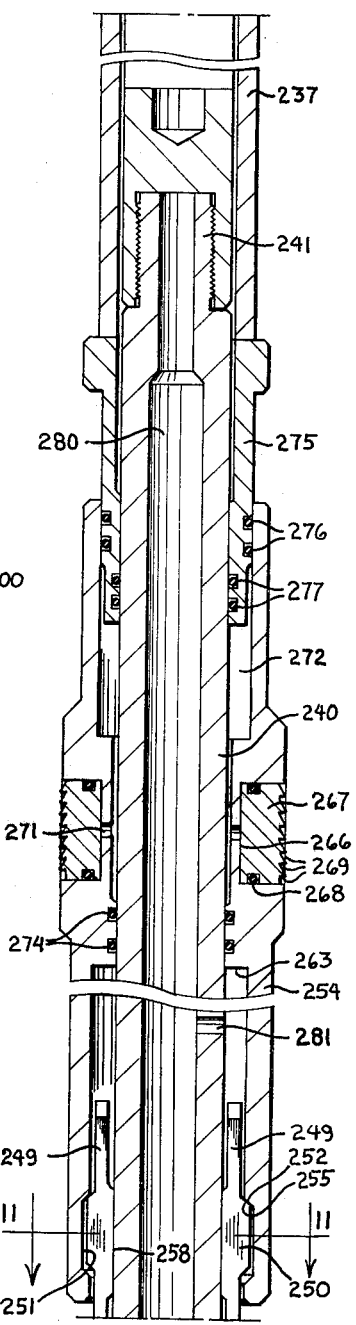

FIGURES 9A, 9B, 9C, and 9D are vertical partly sectional views of a modified form of the setting tool embodying the invention and showing an expanded liner and packer secured thereto, FIGURES 9B, 9C, and 9D being continuations of FIGURES 9A, 9B, and 9C, respectively.

Figure 11:
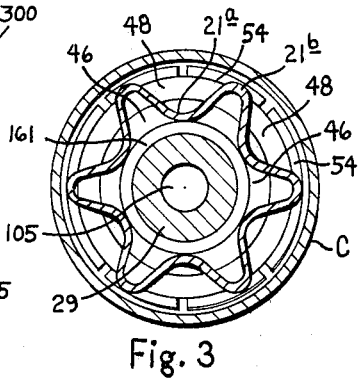
Figure 5:
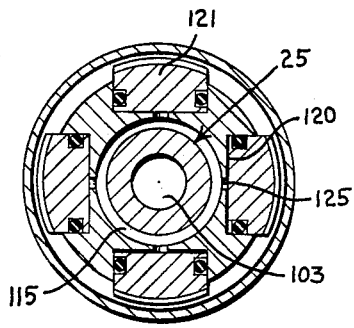
FIGURE 5 is a sectional view taken on line 5—5 of FIGURE 2B.
Figure 3:
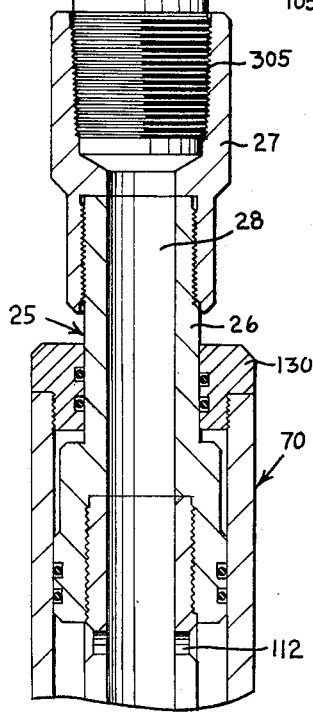
FIGURE 3 is a sectional view taken on line 3—3 of FIGURE 1C.
Figure 4:
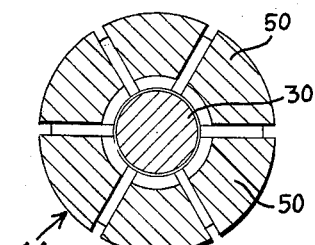
FIGURE 4 is a sectional view taken on line 4—4 of FIGURE 1C.
Figure 6:
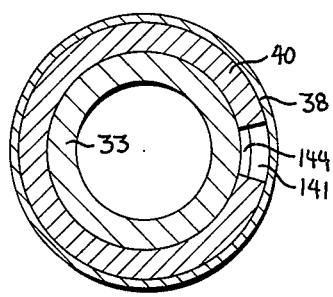
FIGURE 6 is a sectional view taken on line 6—6 of FIGURE 2C.
Figure 7:
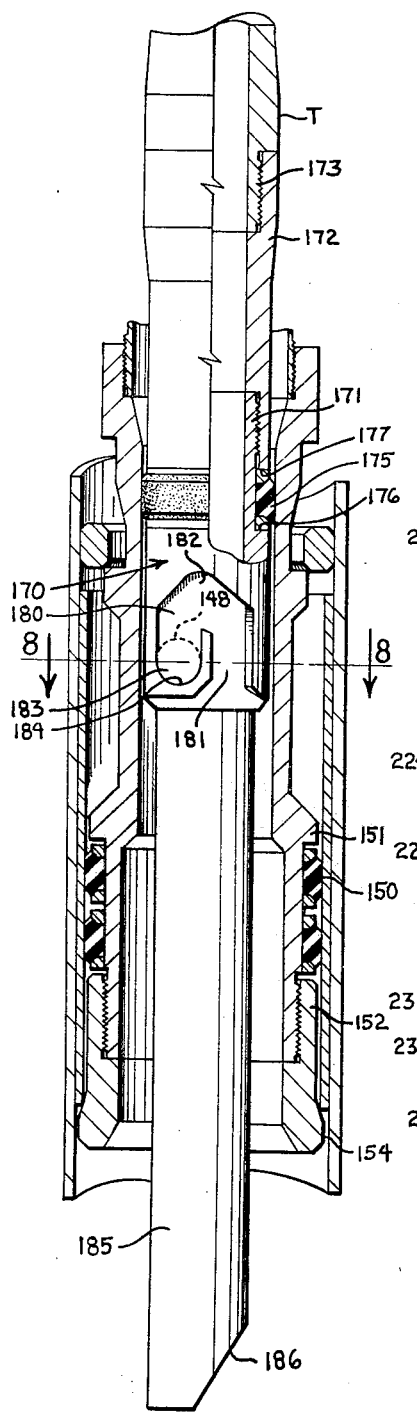
FIGURE 7 is a vertical partly sectional view showing a latch mandrel on the lower end of a production flow conductor extending through the packer and releasably secured thereto.

FIGURE 10 is a schematic view of a well tool assembly including the setting tool illustrated in FIGURES 9A, 9B, 9C, and 9D, being lowered through a well casing and carrying a liner and a packer;

FIGURE 11 is a sectional view taken on line 11—11 of FIGURE 9B; and

Figure 2D:
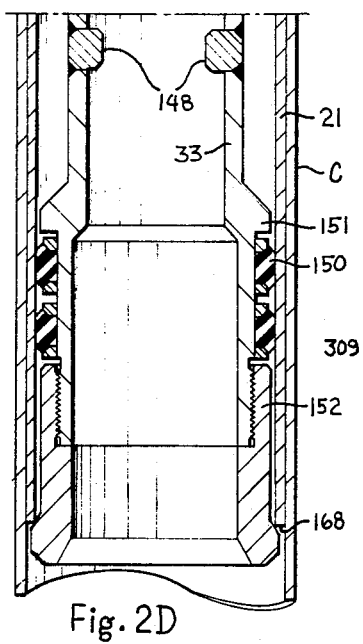
Figure 12:
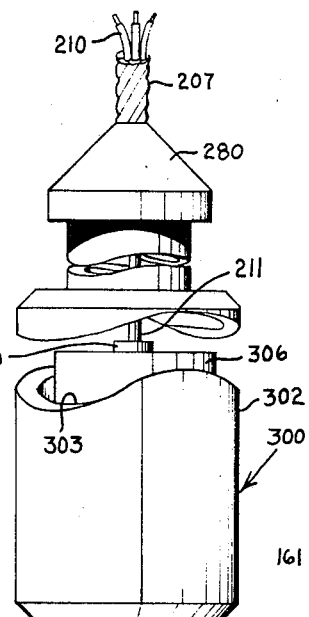

FIGURE 12 is a schematic view of a wire line tool assembly, including a setting tool embodying the invention, by means of which the setting tool and the liner and packer carried thereby are movable in the well casing.

Referring now particularly to FIGURES 1 through 8 of the drawings, the setting tool 20 for expanding and setting a liner 21 in a flow conductor, such as a well casing C, and then setting a packer 22 in the liner includes a mandrel 25 having a top section 26 connectable by a coupling 27 to the lower end of a string of pipe P by means of which the setting tool is movable into the well casing and through which fluid under pressure may be introduced into the top longitudinal passage 28 of the mandrel. The mandrel has a middle port section 29 whose upper end is threaded, as at 30, in the lower end portion of the top section and a bottom section 31 whose reduced top end portion 32 is threaded in the lower end of the middle section. The tubular body 33 of the packer is connected to the bottom mandrel section by a shear sleeve 34 whose upper end is threaded, as at 35, in the dependent annular extension 36 of the bottom mandrel section and whose lower end is threaded in the enlarged portion 37 of the bore of the packer body. The shear sleeve has a weakened middle section which will fail when a predetermined upward pull is exerted on the setting tool mandrel while the packer body is held against upward movement.

The setting tool also includes a latch sleeve 38 threaded on the dependent extension 36 of the bottom mandrel section and telescoped over the upper end of the packer body for holding a split lock ring 40 of the packer in its inner retracted inoperative position, as will be described in greater detail below.

A liner expander 44 is threaded on the lower end portion of the middle mandrel section. The expander has an upper annular reduced top end portion 45 over which telescopes the lower end portion of the longitudinally corrugated liner 21, an outwardly and downwardly inclined or beveled annular top expander surface 46 on which rest the bottom edges of the inner corrugations 21a of the liner, a middle expander surface or shoulder 48 inclined at a smaller angle from the vertical than the top expander shoulder, and a plurality of dependent annular collet fingers 50 whose lower ends are provided with external bosses 52 whose downwardly and outwardly inclined top shoulders provide a bottom expander surface 54. The diameter of the top expander surface 46 is somewhat less than the internal diameter of the unexpanded liner at its outer corrugations 21b so that upon upward movement of the expander relative to the liner, first the top expander surface and then sequentially the middle and bottom expander surfaces engage the liner and progressively and sequentially expand the liner into cylindrical form and into anchored position in the casing. The outward force exerted on the liner and the casing by the collet bosses as they move upwardly through the liner is determined by the force with which the collet fingers resist inward flexing of their lower ends, and the collet bosses in passing through the liner smooth the internal surface thereof. The exterior of the liner may be coated with a sealing and gripping substance which further tends to anchor the expander liner in the casing and also insures a good fluid tight seal therebetween.

During the expansion of the liner it is held against upward movement in the casing by a hold down sleeve 60 of the setting tool releasably secured in the upper position relative to the mandrel illustrated in FIGURES 1B and 1C of the drawings by a shear pin 61 which extends through suitable aligned apertures in the lower end portion of the sleeve and the mandrel. The sleeve has an external flange 62 at its lower end which provides an annular downwardly facing shoulder 63 which engages the top end or edge surface of the liner.

To facilitate the assembly of the setting tool, the hold down sleeve may be formed of several sections threaded to one another. As illustrated, the hold down sleeve may include a bottom section 66 whose top end portion is threaded in the bottom end of a middle section 67, and a top section 68 threaded on the top end of the middle section. The hold down sleeve is telescoped inwardly into a cylinder 70 and the lower end of the middle sleeve section has an external flange 71 which is disposed in the bottom section 72 of the cylinder between the bottom internal flange 74 of the bottom cylinder section and an internal annular flange 75 of the middle cylinder section 76, threadedly connected to the top end of the bottom section. The sleeve flange 71 is provided with external annular recesses in which are disposed O-rings 78 which seal between the flange and the internal surface of the middle cylinder section and similarly the cylinder flange 75 has internal recesses in which O-rings 79 are disposed which seal between the middle sleeve and cylinder sections. The bottom flange 74 of the cylinder also has O-rings 80 disposed in internal recesses of the flange which seal between the bottom sleeve and cylinder sections.

The top sleeve section 68 is disposed in the middle cylinder section 76 between its internal flange 75 and the bottom end of the top cylinder section 82 whose reduced lower end portion 83 is threaded in the upper end of the middle cylinder section. The top sleeve section has an external flange 84 provided with O-rings 85 which seal between the sleeve and cylinder top sections.

The hold down sleve and its external flanges together with the cylinder provide annular chambers 86, 87, 88 and 89. The pressure from the exterior of the cylinder is communicated to the chambers 87 and 88 through the ports 91 and 92, respectively, in the bottom and middle cylinder sections. Pressure from the exterior of the cylinder in the chamber 87 acting on the upwardly facing area of the sleeve between the line of sealing engagement of the O-rings 78 with the bottom cylinder section and the line of sealing engagement of the O-rings 79 with the middle sleeve section exerts a force on the sleeve tending to move it downwardly in the cylinder and such pressure in the chamber 88 acting on the downwardly facing area of the sleeve between the line of sealing engagement of the O-rings 85 with the middle cylinder section and the line of sealing engagement of the O-rings 79 with the middle sleeve section exterts a force on the sleeve tending to move it upwardly. The pressure from the exterior also acting on the downwardly facing surfaces of the sleeve between the line of sealing engagement of the O-ring 96 with the mandrel and the line of sealing engagement of the O-ring 80 with the sleeve exerts an upward force on the sleeve.

The areas of the upwardly and downwardly facing surfaces of the sleeve exposed to the pressure exteriorly may be made equal so that the upward and downward forces exerted on the sleeve by the exterior pressure are equal or preferably so that the areas of the upwardly facing surfaces is greater than that of the downwardly facing surfaces and an effective downward force is exerted by the exterior pressure on the sleeve.

The bottom, middle, and top sleeve sections have internal annular flanges 93, 94 and 95, respectively, in whose internal annular recesses are disposed O-rings 96, 97 and 98, respectively, which seal between the mandrel and the hold down sleeve. The O-rings 96 and 97 are disposed above and below, respectively, lateral ports 101 of the sleeve which provide communication between the lower outer chamber 86 and the exterior of the sleeve. When the sleeve is in its initial position illustrated in FIGURE 1B the outer chamber 86 is closed since the mandrel between the locations of the O-rings 96 and 97 does not have any ports.

The O-rings 97 and 98, when the sleeve is in the position illustrated in FIGURE 1, are disposed above and below the ports 102 of the mandrel which open to its bottom longitudinal passage 103. The mandrel has ports 104 which, when the sleeve is in the position illustrated in FIGURE 1B provide communication between the top passage of the mandrel and the outer chamber 89. The mandrel also has bottom ports 105 which, when the sleeve is in the position illustrated in FIGURE 1B, are below the O-ring 96 of the sleeve. The bottom ports 105 communicate with the bottom longitudinal passage of the mandrel which is in communication with the exterior of the setting tool at the lower end of the bottom passage through aligned ports 106 and 107 in the middle mandrel section and the expander, respectively.

Fluid pressure introduced into the string of pipe P at the surface is communicated through the top mandrel passage 28 and its ports 104 to the top outer chamber 89 and this pressure will exert a downward force on the hold down sleeve over the upwardly facing areas of the top sleeve section 68 between the line of sealing engagement of the O-rings 85 with the top cylinder section and the line of sealing engagement of the O-rings 98 with the mandrel.

The top cylinder section 82 has an internal annular flange 110 in whose internal annular recesses are disposed O-rings 111 which seal between the top cylinder section and the mandrel betwen the ports 104 of the middle mandrel section and its top ports 112 which, when the mandrel and the cylinder are in the positions illustrated in FIGURES 1A and 1B, open below the bottom enlarged end portion 114 of the top mandrel section into an annular chamber 115 provided by the mandrel and the top cylinder section. The top mandrel section has O-rings 118 disposed in external annular recesses thereof which seal between the top mandrel and cylinder sections.

The top cylinder section has a plurality of outwardly opening recesses 120 in which are slidably mounted dogs or buttons 121 whose external surfaces are provided with downwardly facing teeth or serrations 122. The dogs are provided with external annular recesses in which are disposed O-rings 124 which seal between the anchor body and the dogs. The top cylinder section has ports 125 which communicate with the chamber 115 and the dog recesses 120 so that when the pressure within the chamber 115 is increased the force thereof exerted on the inner surfaces of the dogs will move the dogs radially outwardly to engage the well casing and prevent downward movement of the cylinder therein.

A closure ring 130 is threaded in the upper end of the top cylinder section and has a pair of internal annular recesses in which O-rings 131 are disposed to seal between the closure ring and the top mandrel section. An annular closed chamber 133 is thus formed by the mandrel, the cylinder and its closure ring in which air is trapped. The air compresses upon any upward movement of the mandrel relative to the cylinder sleeve and thus yields to permit such relative movement between the mandrel and the cylinder.

If desired, a shear pin 135 may be provided which extends through a suitable aperture of the closure ring into an outwardly opening recess 136 of the top mandrel section to releasably hold the cylinder in its upper position on the mandrel illustrated in FIGURE 1A.

The packer body 33 has an external annular recess 140 defined by top and bottom annular shoulders 141 and 142 which extend perpendicularly to the longitudinal axis of the body and by a lower cylindrical surface 143 which extends upwardly from the bottom shoulder, an expander surface 144 which extends upwardly and outwardly from the lower surface, and a cylindrical lock surface 145 which extends from the expander surface to the top shoulder. The shoulders limit movement of the packer body relative to the lock ring 40. The expander surface serves to expand the lock ring upon downward movement of the packer body relative to the lock ring if the lock ring is not in fully expanded position, and the lock surface locks the ring in its expanded position against movement to its retracted position when the packer body is in its lowermost position relative to the lock ring wherein the top shoulder 141 is in engagement with the top surface of the lock ring.

The packer body also has an internal seal surface 147 and a plurality of inwardly extending latch lugs 148 below the seal surface which coact with latch means of other tools which are telescopical in the packer body, as will be explained below, to releasably lock such well tools in the packer body. The packer body has a seal assembly 150 mounted thereon whose upward movement is limited by the external annular flange 151 of the packer body and whose downward movement is limited by the top end surface of a retainer ring 152 threaded on the packer body. The retainer ring has an external annular flange 154 which provides an upwardly facing stop shoulder 155.

In use, the packer is secured to the bottom section 31 of the mandrel by the shear sleeve 34 as illustrated in FIGURE 1C and its lock ring 40 is then held in retracted position on the lower portion of its latch lock recess 140 by the latch sleeve 38. The elements of the setting tool and of the packer are then in the positions illustrated in FIGURES 1A, 1B, 1C, and 1D. Air under atmospheric pressure is then trapped in the outer chambers 133 and 86 of the setting tool. The buttons or dogs 121 are held in their retracted position since pressure in the casing is greater than that in the passage 28. The hold down sleeve is releasably held in the lower position illustrated in FIGURE 1B by the shear pin 61 and the cylinder is held in the position illustrated in FIGURES 1A and 1B by the pressure external of the device being greater than that on the inside thereof and by the shear pin 135.

The setting tool with the packer mounted thereon is then lowered to a location in the well casing at which it is desired to locate the packer by means of the string of pipe P and when it is located at such location, the pressure within the top passage 28 of the mandrel is increased, as by introducing fluid under pressure into the upper end of the string of pipe P. This operative fluid pressure communicated through the ports 112 to the chamber 115 and thus to the dog recesses 120 of the cylinder causes the dogs 121 to move outwardly and engage the well casing. The dog teeth grip the internal surfaces of the casing to prevent movement of the cylinder in the casing. At this time, the operative fluid pressure in the chamber 115 exerts a downward force over the upwardly facing surfaces of the cylinder between the line of sealing engagement of the O-rings 111 with the mandrel and the line of sealing engagement of the O-rings 118 with the cylinder. The operative fluid pressure from the mandrel top passage 28 is also communicated to the chamber 89 and exerts a downward force on the hold down sleeve 60 and, since the bottom end of the top sleeve section 68 engages the top surface of the internal flange 75 of the middle cylinder section, it also exerts a downward force on the cylinder which however is balanced by the upward force exerted by the operative fluid pressure in the chamber 89 on the downwardly facing surface of the cylinder between the line of sealing engagement of the O-rings 111 with the mandrel and the line of sealing engagement of the O-rings 85 with the cylinder. As a result, the force of the operative fluid pressure produces an effective downward force on the cylinder.

Simultaneously, the force of the operative fluid pressure in the chamber 115 acting on the downwardly facing surfaces of the mandrel between the line of sealing engagement of the O-rings 111 with the mandrel and the line of sealing engagement of the O-rings 118 with the cylinder exerts an effective upward force on the mandrel, the other upwardly facing surfaces of mandrel, the connector sub, and the pipe P exposed to the operative fluid pressure having a combined total area equal to or only slightly greater than the combined total area of the other downwardly facing surfaces of the mandrel, the connector sub, and the pipe also exposed to the operative fluid pressure. As a result the operative fluid pressure tends to move the mandrel and the pipe upwardly relative to the cylinder.

It will thus be apparent that no upward or downward movement of the cylinder can then take place and the sleeve and the liner are very accurately positioned within the well casing against upward movement whenever operative fluid pressure is introduced into the top mandrel passage 28 and the dogs move outwardly into gripping engagement with the well casing.

The operative fluid pressure then tends to move the mandrel and the pipe upwardly and the pipe may also be pulled upwardly at the surface to move the mandrel and the packer upwardly relative to the cylinder, the hold down sleeve and the liner. The pins 61 and 135 are caused to shear to permit such upward movement of the mandrel relative to the hold down sleeve and the cylinder when a predetermined upward force is exerted on the mandrel. As the mandrel moves upwardly, the expander 44 progressively, from the bottom toward the top, expands the longitudinal corrugations of the liner radially outwardly in the manner described above.

After the mandrel has been moved an upward distance sufficiently great that the expander 44 has moved upwardly through the liner and the liner has been fully expanded and anchored in the well casing so that it is no longer necessary for the hold down sleeve to hold the liner against upward movement in the casing, the mandrel ports 104 move upwardly past the O-rings 111 and fluid communication between the top longitudinal passage 28 and the outer chamber 89 is thus terminated. At this time the ports 102 have not been moved upwardly of the O-rings 98 of the top sleeve section so that the pressure trapped in the chamber 89 still exerts a downward force on the hold down sleeve and no fluid flow can take place from the top longitudinal passage 28 to the bottom longitudinal passage through the outer chamber 89. As the ports 102 are thereafter moved above the O-rings 98, communication is established between the outer chamber 89 and the casing through the bottom longitudinal passage 103 of the mandrel and the ports 106 and 107. The downward force with which the hold down sleeve is biased downwardly is thus reduced.

A downward force, however, is still exerted on the hold down sleeve by the well casing pressure since the area of the upwardly facing surfaces of the sleeve within the chambers 89 and 87 is considerably greater than the downwardly facing area of the sleeve within the outer chamber 86 which is still at atmospheric pressure which is of considerably smaller value than the casing pressure. As upward movement of the mandrel is continued, the ports 105 move upwardly past the O-ring 96 thus admitting the casing pressure into the chamber 86 through the lower longitudinal passage 103 and the mandrel ports 105 and the sleeve ports 101. The pressure across the hold down sleeve is thus equalized, all surfaces of the sleeve now being exposed to the casing pressure.

The reduced upper end portion 45 of the expander now enters into the downwardly opening recess 160 of the hold down sleeve and its top end surface 161 engages the downwardly facing annular shoulder 162 of the sleeve so that further upward movement of the mandrel will now cause upward movement of the mandrel will now cause upward movement of the hold down sleeve and the shoulder 63 of the sleeve is moved out of engagement with the top edge surface of the liner.

After the liner is completely expanded, the expander moves upwardly of the liner, and the sleeve has been released for upward movement with the mandrel, the ports 102 move above the O-rings 111 and the pressure in the chamber 115 is released. The dogs are thus freed to move inwardly, and, since their teeth face downwardly, will now not prevent upward movement of the cylinder. The cylinder is then moved upwardly with the mandrel and the sleeve when the stop shoulder 165 of the sleeve engages the bottom end surface 166 of the cylinder. If desired, the pressure in the passage 28 may be released immediately prior to the movement of the ports 102 past the O-ring 111 in order that the casing pressure move the dogs to their retracted positions.

Thereafter the packer moves upwardly through the now expanded liner which provides a smooth internal seal surface until its upward movement is arrested due to the engagement of the stop shoulder 155 of the packer retainer ring 152 with the bottom edge surface 168 of the liner. A further upward force exerted by means of the string of pipe P on the mandrel and, therefore, on the shear sleeve 34 causes the shear sleeve to fail and as the latch sleeve 38 moves upwardly relative to the packer body and out of engagement with the lock ring 40, the lock ring, which is then positioned above the top end shoulder 169 of the liner, expands outwardly until it engages the well casing. The packer will now tend to remain in the upper position illustrated in FIGURE 2C due to the frictional engagement of its packing or seal means 150 with the internal surfaces of the liner which it sealingly engages. Should any downward force be exerted on the packer body tending to cause it to move downwardly, the engagement of the top shoulder 141 of the packer body with the top surface of the lock ring and the engagement of the lock ring with the top end surface 169 of the liner will limit its downward move ment so that the packer will remain latched to the liner.

If it is then desired to connect a well tool to the packer, such as a string of tubing T through which well fluids may be produced to the surface, the lower end of the tubing is provided with a latch mandrel 170 whose upper reduced end portion is threaded in a downwardly opening recess or enlargement, as at 171, of a connector sub 172 in whose upper end is threaded the reduced lower end portion 173 of the bottom end of the string of tubing. A seal assembly 175 is mounted on the upper portion of the latch mandrel, its downward movement on the latch ment being limited by the downwardly facing annular shoulder 176 of the latch mandrel and its upward movement being limited by the downwardly facing annular end shoulder or surface 177 of the connector sub 172. The latch mandrel has a pair of opposed inverted J-slots 180 which have downwardly opening leg portions 181, connector portions 182, and latch portions 183. As the latch mandrel is moved into the packer body, the downwardly opening leg portions 181 of its J-slots receive the latch lugs 148 of the packer body. The latch mandrel is then rotated in a counterclockwise manner, FIGURES 7 and 8, to move the latch portions 183 of the J-slots in alignment with the lugs, whereupon upward movement of the string of tubing will cause the lugs to be received in the latch portions of the J-slots and upward movement of the latch mandrel relative to the packer body will then be limited by the engagement of the latch lugs with the upwardly facing shoulders 184 of the latch mandrel defining the lower ends of the latch portions of the J-slots.

The mandrel has a reduced dependent extension 185 whose lower end may be beveled, as at 186, to provide a cam surface which facilitates or guides its downward movement into the packer body.

The tubing may be easily released for removal from the well thereafter by merely lowering the string of tubing to cause the latch lugs to be in the upper connector portions of the J-slots, rotating the tubing in a clockwise direction to cause the lugs to be placed in alignment with the downwardly opening leg portions 181 of the J-slots, and then moving the tubing upwardly.

It will now be apparent that the setting tool 20 may be used to expand a liner in a flow conductor such as a well casing and thereafter set a packer in such liner, both the liner and the packer being movable into such flow conductor simultaneously by means of the setting tool and that the sequential expansion of the liner and the setting of the packer in the expanded liner is accomplished by a simple upward movement imparted to the means by which the setting tool is lowered into the well casing after the pressure in the pipe at the surface has been increased to move the dogs 121 of the cylinder outwardly into gripping engagement with the well casing to hold the cylinder anchored in the casing to accurately position and hold the liner against upward movement in the casing.

It will further be seen that cylinder constitutes an anchor means and that the cylinder, the mandrel, and the hold down sleeve have cooperable fluid pressure operable means for holding the hold down sleeve against upward movement, after the cylinder has been anchored to the casing, until the mandrel has moved a predetermined upward distance relative to the sleeve and the cylinder and the expander has expanded the lower portion of the liner into anchored engagement with the well casing.

It will further be seen that the upper portions of the liner are expanded after the hold down sleeve has been released for upward movement so that the hold down sleeve does not frictionally engage the top end of the liner and impede the expansion of the top portion of the liner.

Referring now particularly to FIGURES 9 through 11 of the drawings, the setting tool 200 embodying the invention includes a mandrel 201 having a top connector section 203 which may be connected by a suitable coupling 204 to the lower end of another well tool, such as a casing collar recess locator 205, of an assembly of wireline tools. The assembly of tools is movable through a flow conductor, such as the well casing C, by the usual flexible member or cable 207 which has a plurality of pairs of electric conductors 210 and 211 extending therethrough through one pair of which the electric signals from the collar recess locator, which may be of the well known neutron detector type, may be transmitted to a suitable indicator or recorder device 212 and through another pair of which an electric current may be transmitted to an igniter device 214 of the setting tool to cause ignition of a powder charge 215 located in a chamber 217 of the mandrel. The igniter and power charge may be of the type illustrated in the United States Letters Patent to Baker, No. 2,640,546. The top section 203 of the mandrel has a reduced portion 219 threaded in the upper end of a chamber section 220 of the mandrel and is provided with an O-ring 220 for sealing therebetween. The top mandrel section has a downwardly opening bore 221 into which the explosive charge extends and in whose upper reduced end portion 222 is rigidly secured the igniter device 214.

The power charge 215 is supported in its upper position in the chamber 217 illustrated in FIGURE 9A by a piston 224 disposed in the chamber mandrel section 220. The piston has a rod 226 which extends downwardly from the chamber through the longitudinal passage 228 of a mandrel section 229 whose enlarged upper end portion 230 is threaded in the lower end of the chamber mandrel section. An O-ring 231 disposed in an external annular recess of the mandrel section seals between it and the chamber section and an O-ring 232 disposed in an internal recess of the mandrel section 230 seals between it and the piston rod 226. The piston rod extends downwardly into a longitudinal slot 235 of the mandrel section 229 and is rigidly secured to a tubular extension 237 disposed about the mandrel by a pin 238 which extends through aligned apertures in the extension and the piston rod.

The mandrel also includes a tubular section 240 whose upper reduced end portion 241 is threaded in a downwardly opening bore of the section 229 and a bottom section 30a whose upper reduced threaded end portion 32a is threaded in the lower end of the tubular mandrel portion 240. An expander 44a is threaded on the bottom end of the tubular mandrel section and a packer 22a is secured to the bottom mandrel section.

The bottom mandrel section 30a, the expander 44a, and the packer 22a being identical to the expander 44, the bottom section 30 and packer 22 of the setting tool 20, their elements have been so provided with the same reference numerals, to which the subscript a has been added, as the corresponding elements of the bottom mandrel section 30, the expander 44 and the packer 22.

A hold down sleeve 245 is releasably secured to the mandrel by a shear pin 246, or, alternatively, it may be supported against downward movement on the mandrel by the liner 21a whose inner corrugations engage and rest upon the top expander surface 46a. The mandrel at its upper end portion has longitudinal upwardly opening slots 248 which define a plurality of resilient collet fingers 249 provided adjacent their upper ends with external bosses 250 which are received in an internal annular recess 251 of a cylinder 254. The engagement of the top shoulders 252 of the external bosses with the annular downwardly and outwardly inclined annular shoulder 255 defining the top end of the annular recess limits downward movement of the cylinder relative to the hold down sleeve and the mandrel. The collet fingers also have inner bosses 258 which engage the mandrel lock surface 259 above the external annular groove 260 of the tubular mandrel section 240 and are receivable therein when the mandrel is moved upwardly a predetermined distance relative to the sleeve. The top ends of the collet fingers are engageable with the downwardly facing internal annular shoulder 263 of the cylinder to limit upward movement of the hold down sleeve relative to the cylinder.

The cylinder is provided with a plurality of external recesses 266 in which dogs or buttons 267 are movably disposed. The dogs have external annular recesses in which O-rings 268 are disposed which seal between the dogs and the cylinder. The dogs have downwardly facing teeth or serrations 269. The cylinder has ports 271 which provide communication between the recesses 266 and an annular chamber 272 which is closed at its lower end by the O-rings 274 disposed in internal annular recesses of the cylinder which seal between the cylinder and the mandrel. The upper end of the chamber 272 is closed by a piston sleeve 275 which extends into the enlarged upper portion of the bore of the cylinder and is provided with O-rings 276 disposed in an external annular recess thereof which seal between the piston sleeve and the cylinder and the O-rings 277 disposed in internal annular recesses thereof which seal between the piston sleeve and the mandrel. The piston sleeve is held in the upper position illustrated in FIGURE 9B by a liquid, such as oil, trapped in the closed chamber 272. The area of the piston sleeve between the lines of sealing engagement of its O-rings 276 and 277 with the cylinder and the mandrel is equal to or less than the combined areas of the dogs within the lines of the sealing engagement of their O-rings 268 with the cylinder in order that the hydrostatic pressure in the casing does not move the piston sleeve downwardly and thus cause premature outward movement of the dogs. It will be apparent that when the piston sleeve 275 is moved downwardly, the pressure of the liquid trapped in the closed chamber 272 is applied to the inner surfaces of the dogs 267 and causes the dogs to move outwardly to engage the internal surfaces of a flow conductor, such as a well casing C, to anchor the cylinder against downward movement in the well casing.

The liquid in the chamber is allowed to escape from the chamber to the longitudinal passage 280 of the mandrel through ports 281 thereof when the mandrel is moved a predetermined distance upwardly relative to the cylinder.

In use, the setting tool 200 with its elements in the position illustrated in FIGURE 9 and with the liner 21a and packer 220 secured thereto, is connected by the coupling collar 204 to the lower end of a collar recess detector 205 which, in turn, is connected by a usual connector head 284 to the cable 207. The collar log of the well casing is of course available to the operator who, as he lowers the string of tools through the well casing, by means of the collar recess detector and the indicator device 212 which produces a signal each time the locator moves past a collar recess can determine very precisely and accurately the location of the liner 21a in the casing. When the liner is located at a desired location in the well casing, an electric current is transmitted through a pair of electric conductors to the igniter device 214 which ignites the powder charge 215. The powder when it ignites generates a large volume of gas. The expanding gas thus generated in the chamber tends to move the piston 224 downwardly relative to the mandrel and the mandrel upwardly.

As the piston moves downwardly, it moves its rod extension 237 downwardly which, in turn, moves the piston sleeve 275 downwardly relative to the cylinder which is now held against downward movement relative to the hold down sleeve 245 by the collet finger bosses 250. The hold down sleeve, in turn, is held against downward movement relative to the mandrel by the liner 21a and the shear pin 246. As the piston sleeve 275 moves downwardly, the liquid in the chamber 272 is placed under pressure thereby and the force of this liquid pressure moves the dogs outwardly into gripping engagement with the well casing.

Once the cylinder is anchored to the well casing, the force of the expanding gas moves the mandrel upwardly relative to the cylinder, the pin 246 shearing when a predetermined upward force is exerted on the mandrel, while the hold down sleeve is held against upward movement due to the engagement of the top shoulders of the external bosses 250 of its collet fingers 249 with the internal shoulder 255 of the cylinder. As the mandrel moves upwardly relative to the liner, the liner is expanded into sealing and anchoring engagement with the well casing. After the expander 44a has moved through the liner so that the liner is expanded and anchored in the well casing against upward movement, and prior to the engagement of the top shoulder 161a of the expander with the shoulder 255 of the hold down sleeve, the mandrel recess 260 moves into alignment with the internal collet finger bosses 258 so that the hold down sleeve is freed for upward movement relative to the cylinder, the collet fingers being moved resiliently inwardly due to the camming action between the outwardly and downwardly inclined cam shoulders 252 of the external bosses 250 with the shoulder 255 defining the top end of the latch recess 251. As the upward movement of the mandrel continues, and prior to the engagement of the top end surfaces of the collet fingers with the downwardly facing shoulder 263 of the cylinder, the port 281 of the mandrel moves upwardly of the O-rings 274 so that the liquid pressure within the chamber 272 is released and the pressure across the buttons or dogs is equalized and they are no longer biased outwardly with great force. As a result, since the dog teeth face downwardly, the cylinder moves upwardly with the mandrel and the piston sleeve when the top ends of the collet fingers engage the shoulder 263 of the cylinder. The upward movement of the mandrel may now be continued by pulling upwardly on the cable 207 at the surface. As the upward movement of the setting tool is continued, the packer 22a is moved upwardly through the expanded liner until its stop shoulder 155a engages the bottom edge of the liner whereupon an upward force exerted by means of the cable on the mandrel causes the shear sleeve 34a to fail and the packer means 150a is left positioned in the liner with its seal or packing means 150a sealing between the packer body and the liner. The latch sleeve 38a, of course, moves upwardly and out of engagement with the lock ring 40a so that the lock ring 40a expands and thereafter limits downward movement of the packer relative to the liner. A string of tubing may then be releasably secured to the packer by means of a latch mandrel, such as the one illustrated in FIGURE 7.

If desired, as illustrated in FIGURE 12, the operative fluid pressure for the setting tool 20 may also be provided by any suitable gas generator device or assembly 300 connected to the top end of its top mandrel section 26 by means of the connector sub 27. The gas generator assembly 300 includes a tubular member 302 having an internal chamber 303 closed at its top end and whose lower tubular reduced end portion 305 is threaded in the upper end portion of the connector sub 27 so that the pressure of the gas generated by the ignition of the powder charge 306 in the chamber will be transmitted into the top passage 28 of the mandrel 25. An insulated pair of electric conductors 211 of a cable 207 extend into the chamber through a suitable sealed aperture to operate a suitable means 309 for igniting the powder charge. When the setting tool 20 is provided with such gas generating assembly it may be lowered and moved through a well casing by means of the flexible cable 207 and be connected in a string of wireline tools which may also include a casing collar recess locator such as the locator 205 in the same manner as the setting tool 200. The setting tool is operated by providing an electric current to the igniting device 309 through a pair of insulated conductors 211 of the cable 207 when by use of the collar recess locator 205 and an indicator device such as the device 212 it is determined that the liner is at the desired location in the well casing. When the powder charge 306 is ignited the generated gas provides the operative fluid pressure to the top longitudinal passage 28 and the expander will then be moved upwardly into the liner carried by the tool 20, the dogs of the cylinder 70 will be moved to their outer expanded positions locking the cylinder to the well casing, the mandrel 25 will be moved upwardly to cause the expander to expand the liner and thereafter the hold down sleeve will be released for upward movement as described above in connection with the operation of the setting tool 20, as when it is lowered into the well casing by means of a pipe P and the operative fluid pressure is transmitted through the pipe P into the top longitudinal passage. When the ports 102 of the mandrel move above the O-rings 111, the mandrel is moved to the position illustrated in FIGURE 2B relative to the cylinder, the operative fluid pressure in the chamber 115 and passage and therefore the chamber 313 is released to the bottom longitudinal passage 103 of the mandrel and the pressure across the dogs 121 is equalized. Since the dogs have downwardly facing teeth, they will not resist upward movement of the mandrel through the well casing and the setting tool may be moved upwardly in the well casing to set the packer in the expanded liner and removed from the well.

It will be apparent that, if desired, the setting tool 200 may be operated by fluid pressure delivered from the surface to the chamber 217 above the piston 225 by means of a string of pipe instead of by gas produced by a gas generating means carried off the tool. In this case, the chamber section 200 is connected directly to the lower end of the string of pipe so that fluid pressure from the pipe is communicated to the chamber 217 above the piston.

It will now be seen that several forms of a new and improved setting tool for expanding a liner into sealing and anchored engagement in a well casing have been illustrated and described and that the expanded liner provides a seal surface of smaller diameter than the well casing and top and bottom stop surfaces engageable by a stop means of a packer for securing the packer against displacement from the liner after it is installed by means of the setting tool in the expanded liner.

It will further be seen that if several liners and packers are to be set in the casing at vertically spaced locations therein, the lowermost liner and packer are installed first, then the next upper packer and liner, and so on. As a result, the seal means of the packers are not worn due to engagement with the restrictors in the casing above the location at which they are to be mounted.

It will further be seen that the well casing at the time of its installation in a well bore does not have to have any landing nipples of restricted internal diameter connected therein in and to which other well tools such as packers may thereafter be installed or releasably secured, and that, since the well casing has no such restrictions, various tools and fluids may be moved through the casing without passing restrictions in the casing which would impede their movement or cause undue wear to the components of such tools.

It will further be seen that due to factors beyond the control of the operator, such as the elongation of the well casing due to tension as a long length thereof is installed in the well, changes in temperature and variations in the lengths of the sections of the well casing or the degree to which their threaded end portions extend into coupling collars which connect adjacent casing sections, the locations of the landing nipples cannot be precisely predetermined at the time of the making up of the well casing so that, when the casing is installed in the well bore, the landing nipples will be at desired locations in the well. By use of suitable surface equipment, such as a collar recess detector and a cable length measuring device, the liners may be located very precisely at desired locations in the well casing.

It will further be seen that the setting tools embodying the invention may be movable downwardly into a casing by means of a string of pipe through which an operative fluid pressure may be introduced to operate the setting tools or, if desired, the setting tools may be operable by fluid pressure generated by gas generating means of setting tool.

It will further be seen that a new and improved method of completing a well has been described and illustrated which includes the steps of installing in the well bore a flow conductor, such as a well casing, performing various operations on the well by means of the unrestricted passage of the flow conductor, and then providing a restriction in the flow conductor of smaller internal diameter than the internal diameter of the flow conductor to provide an internal seal surface and oppositely facing stop shoulders in order that a well tool may be secured in sealed relation in the flow conductor at such restriction.

It will further be seen that the restriction may be provided by locating a liner in the flow conductor at a desired position, expanding the liner into sealing and anchored position in the flow conductor, and thereafter securing a packer in such expanded liner.

It will further be seen that the method may include simultaneously locating the liner and a packer in a flow conductor, expanding the liner into sealing and anchored engagement in the flow conductor, and then moving the packer into the liner, and that preferably the expansion of the liner and the setting of the packer is accomplished by moving an expander upwardly through the liner and then moving the packer upwardly into the liner so that the setting tool and expander may thereafter be easily removed from the well.

It will also be seen that a new and improved packer has been illustrated and described which is connectable to a setting tool having means for expanding a liner in a well casing and which is movable by the setting tool into the liner after it has been expanded, and that the packer has a body provided with a stop shoulder engageable with the bottom end surface of the expanded liner and a latch releasably held in retracted position which expands when the setting tool is released from the packer to engage the top end surface of the expanded liner to limit its downward movement relative to the packer.

It will further be seen that the packer body is provided with external seal means for sealing between the body and the liner and with an internal seal surface engageable by seal means of another well tool positionable in the packer and with latch means engageable with such another well tool for releasably connecting such well tool to the packer body.

It will also be apparent that, if the tools 20 and 200 are secured into the well casing on a pipe, a collar recess locator is mounted on the pipe above the setting tool and will be operated to determine the location of a liner carried by the setting tool in the well casing.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A setting tool including: a mandrel having an expander and a liner hold down means longitudinally spaced from one another whereby a liner is mountable on said mandrel between said hold down means and said expander means; anchor means carried by said mandrel for engaging a flow conductor in which a liner is to be installed, said anchor means having movable means movable by fluid pressure into anchoring engagement with a flow conductor; said anchor means, said hold down means and said mandrel having cooperable means for holding said hold down means against movement in one longitudinal direction relative to said anchor means, said cooperable means releasing said hold down means for movement in said one longitudinal direction when said mandrel has moved a predetermined distance in said one longitudinal direction relative to said hold down means, said expander expanding a liner carried by the setting tool upon movement of said mandrel in said one direction relative to said hold down means; and means for releasably securing a packer to said mandrel in position to be moved into said liner and expanded into anchored position in said flow conductor by said expander upon movement of said mandrel in said one direction.

2. A setting tool of the character set forth in claim 1, in combination with a liner settable by said setting tool in a flow conductor providing an internal seal surface and opposed stop shoulders in the longitudinal passage of the flow conductor and a packer settable in said liner by said setting tool and including: a tubular body having a lower upwardly facing external stop surface engageable with a downwardly facing stop shoulder of said liner to limit upward movement of the packer body relative to said liner; expandable lock means on said body for engaging an upwardly facing shoulder of said liner for limiting downward movement of the packer body relative to said liner, and external seal means carried on said body engageable with the internal seal surface of said liner.

3. The packer of claim 2, wherein said expandable lock means includes a lock ring, said packer body having external annular recesses providing oppositely facing shoulders for limiting longitudinal movement of the body relative to said lock ring, said lock recess having a lower portion in which the lock ring is positionable when in retracted position, said packer body having an upwardly and outwardly extending camming surface for expanding the lock ring into fully extended position and a lock surface for holding the lock ring in expanded position when said packer body is moved downwardly relative to said lock ring.

4. The packer of claim 3, wherein said body is provided with an internal seal surface and latch means extending inwardly into said passage of said packer body below said seal surface for releasably latching a well tool receivable in said passage of said packer body.

5. The packer of claim 3, and means releasably secured to said packer body for holding said lock ring in retracted position.

6. The setting tool of claim 1, wherein said anchor means includes a cylinder means, said movable means being carried by said cylinder and engageable with a flow conductor for preventing movement of the cylinder in a flow conductor; and means for providing operative fluid pressure to said cylinder for moving said movable means outwardly to engagement with a flow conductor.

7. The setting tool of claim 6, wherein said means for providing said operative fluid pressure includes a flow conductor to which said cylinder is connected and by means of which the setting tool is movable in a well.

8. The setting tool of claim 6, wherein said cooperable means includes coengageable means on said hold down means and said cylinder and lock means on said mandrel holding said stop means in engagement to prevent movement of said hold down means in said one direction relative to said cylinder, said lock means of said mandrel moving out of engagement with said stop means of said hold down means when said mandrel is moved a predetermined distance in said one direction relative to said hold down means to permit said stop means to disengage and permit movement of said hold down means in said one direction.

9. The setting tool of claim 6, wherein said means for providing fluid pressure includes gas generating means carried by said setting tool, and means operable from the surface of a well for causing operation of said gas generating means.

10. The setting tool of claim 9, wherein said cooperable means comprises pressure responsive means exposed to said operative fluid pressure and pressure exteriorly of the setting tool for exerting a force on said hold down means to hold said hold down means against movement in said one direction relative to said cylinder and port means in said cylinder, said hold down means and said mandrel for equalizing the pressure across said pressure responsive means to release said hold down means for movement in said one direction relative to said cylinder.

11. A setting tool including: a mandrel having external expander means; a hold down sleeve disposed on said mandrel above said expander means for engaging the top end of a liner mountable on the mandrel between said hold down sleeve and said expander means; a cylinder disposed about said mandrel, said hold down sleeve having an upper portion extending between said cylinder and said mandrel, said cylinder having a radially outwardly expandable means for engaging a flow conductor to hold said cylinder against movement in a flow conductor, said mandrel and said sleeve providing an annular chamber; means for providing fluid pressure to said chamber to move said movable means outwardly to engage a flow conductor; and cooperable means on said cylinder, said mandrel and said hold down sleeve for holding said hold down sleeve against upward movement relative to said cylinder, said cooperable means releasing said hold down sleeve for upward movement upon predetermined upward movement of said mandrel relative to said hold down sleeve.

12. The setting tool of claim 11, wherein said means for providing fluid pressure to said chamber includes a gas generating means and a piston sleeve movable into said chamber by the force of the pressure of gas generated by said gas generating means.

13. The setting tool of claim 12, wherein said cooperable means comprises coengageable stop means on said cylinder and said hold down sleeve and lock means on said mandrel for holding said stop means in engagement to prevent upward movement of said hold down sleeve relative to said cylinder, said lock means moving out of engagement with said stop means on said hold down means to permit their disengagement with said stop means of said cylinder when said mandrel is moved a predetermined distance upwardly relative to said hold down means.

14. The setting tool of claim 11, wherein said means for providing fluid pressure to said chamber includes a top longitudinal passage provided in said mandrel, said mandrel having port means providing communication between said chamber and said top longitudinal passage, and means for introducing fluid under pressure to said top longitudinal passage.

15. The setting tool of claim 14 wherein said cooperable means includes means for causing fluid pressure from said top longitudinal passage to exert a downward force on said hold down sleeve, and means for equalizing the pressure across said hold down sleeve to permit its upward movement relative to the mandrel when said mandrel is moved upwardly said predetermined distance relative to said hold down sleeve.

16. A setting tool for expanding a liner into sealing and anchored engagement in a flow conductor, said setting tool including: a mandrel having means at its upper end by which the mandrel is connectable to means for moving the setting tool through a flow conductor; an expander secured to said mandrel; hold down means mounted on said mandrel above said expander for limited longitudinal movement relative to the mandrel and spaced above said expander whereby a liner in contracted condition may be disposed on said mandrel between said expander and said hold down means; anchor means on said mandrel for limited longitudinal movement relative to said mandrel and said hold down sleeve, said anchor means having expandable means for engaging internal surfaces of a flow conductor to hold an anchor means against longitudinal movement therein; and cooperable means on said mandrel, said hold down means and said anchor means for holding said hold down means against upward movement relative to said anchor means during predetermined upward movement of said mandrel and expander relative to said hold down means whereby said expander may expand a liner into anchored engagement with a flow conductor while said hold down means holds the liner against upward movement, said cooperable means releasing said hold down means and said anchor means for upward movement with said mandrel upon predetermined upward movement of said mandrel relative to said hold down means.

17. The setting tool of claim 16, and means for releasably securing a packer to the lower end of said mandrel whereby a packer secured to the lower end of the mandrel is movable into a liner previously expanded by the expander upon upward movement of the setting tool relative to the liner.

References Cited

UNITED STATES PATENTS

| | | | |
|---|---|---|---|
| 3,162,245 | 12/1964 | Howard et al. | 166—207 |
| 3,203,483 | 8/1965 | Vincent | 166—207 |
| 3,358,760 | 12/1967 | Blagg | 166—207 |

JAMES A. LEPPINK, Primary Examiner

U.S. Cl. X.R.

166—207, 315